May 26, 1925.　　　　　　　　　　　　　　　　　　　　　　　　　1,539,462
T. CARROLL
TICKET MACHINE
Filed April 30, 1921　　　　　6 Sheets-Sheet 1
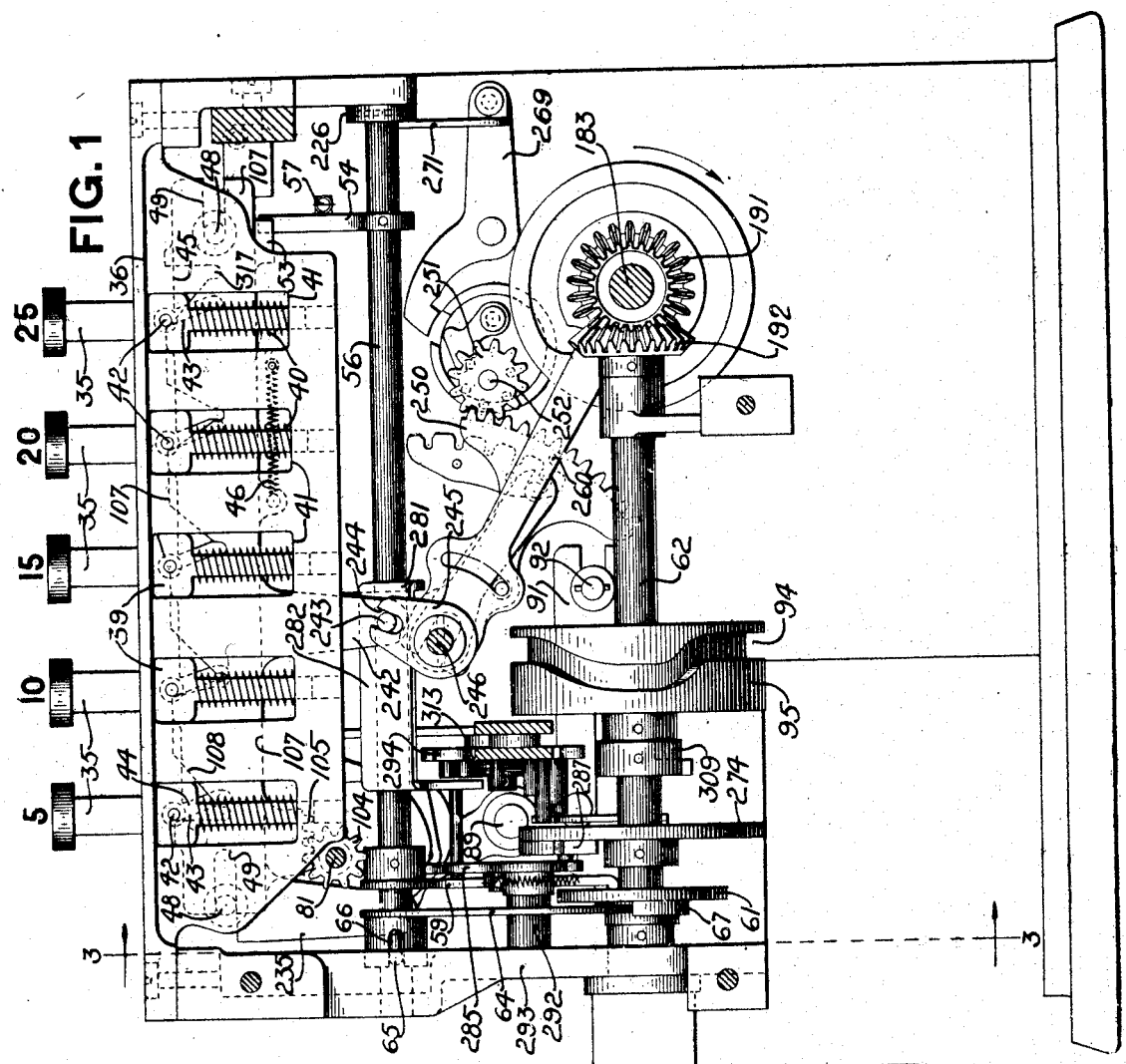
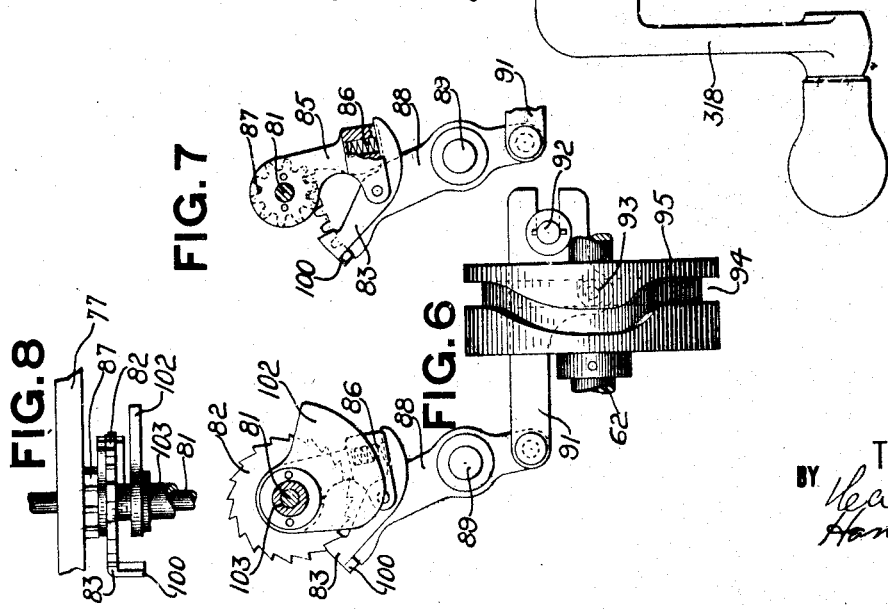
Inventor
THOMAS CARROLL May 26, 1925.  T. CARROLL  1,539,462
TICKET MACHINE
Filed April 30, 1921  6 Sheets-Sheet 2
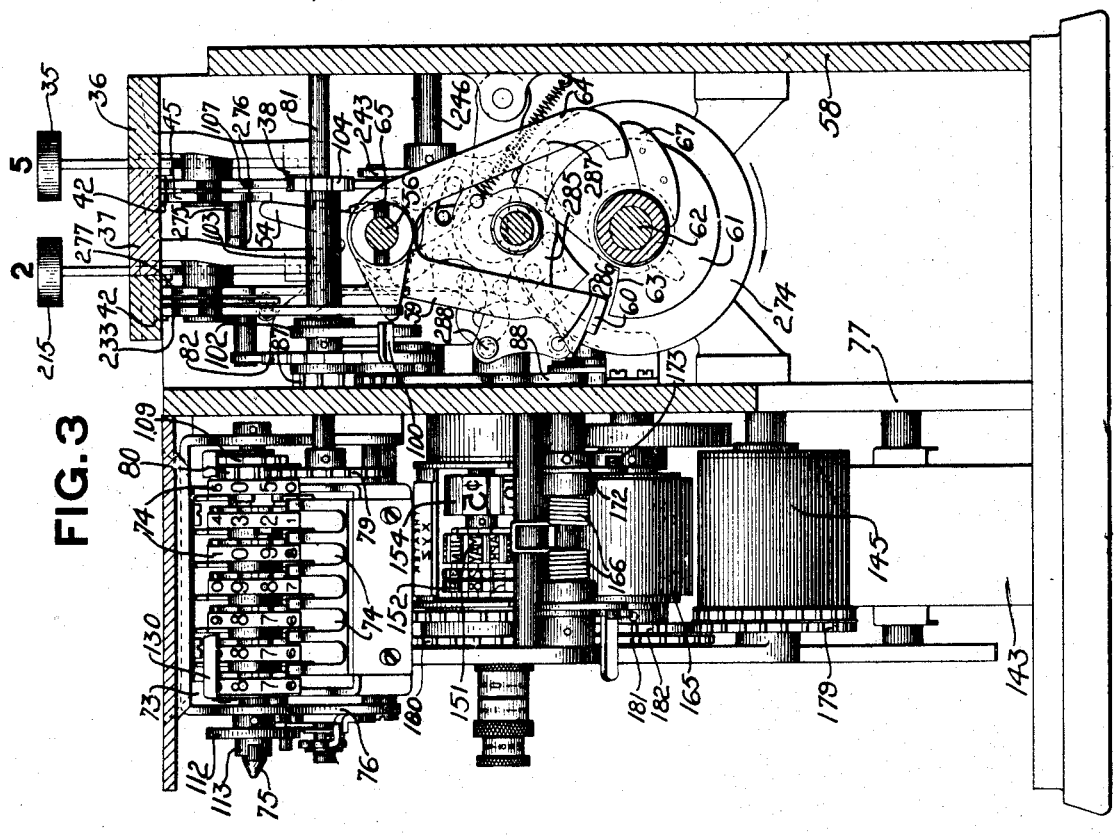
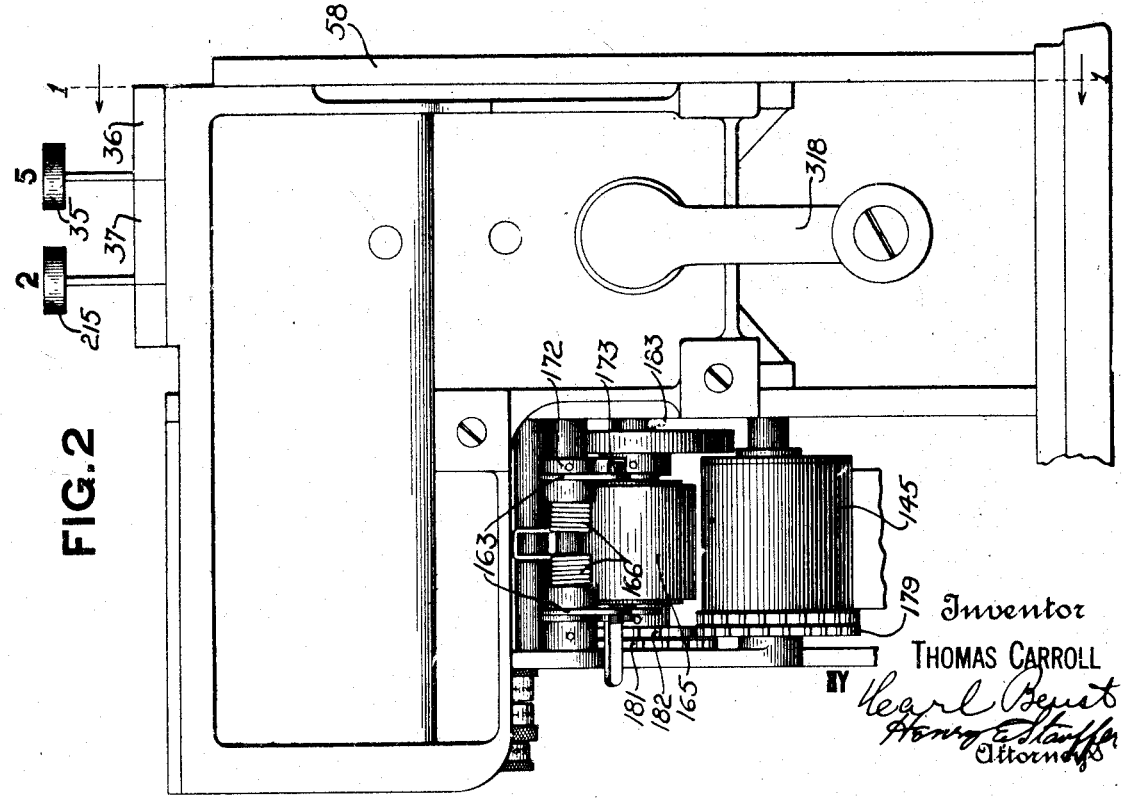
Inventor
THOMAS CARROLL May 26, 1925.
T. CARROLL
TICKET MACHINE
Filed April 30, 1921      6 Sheets-Sheet 3
1,539,462
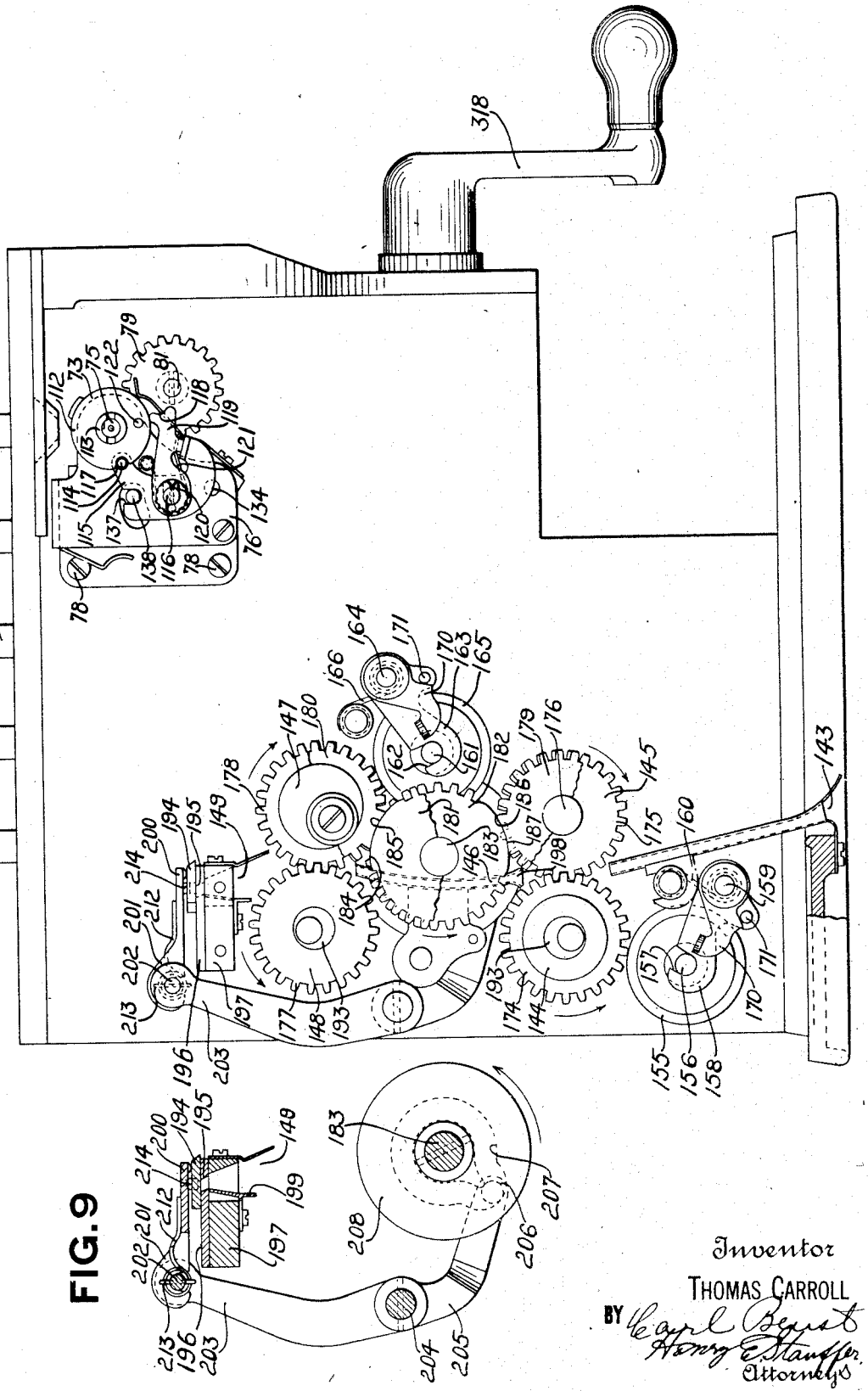
Inventor
THOMAS CARROLL
BY
Attorneys May 26, 1925.  
T. CARROLL  
TICKET MACHINE  
Filed April 30, 1921  
1,539,462  
6 Sheets-Sheet 4
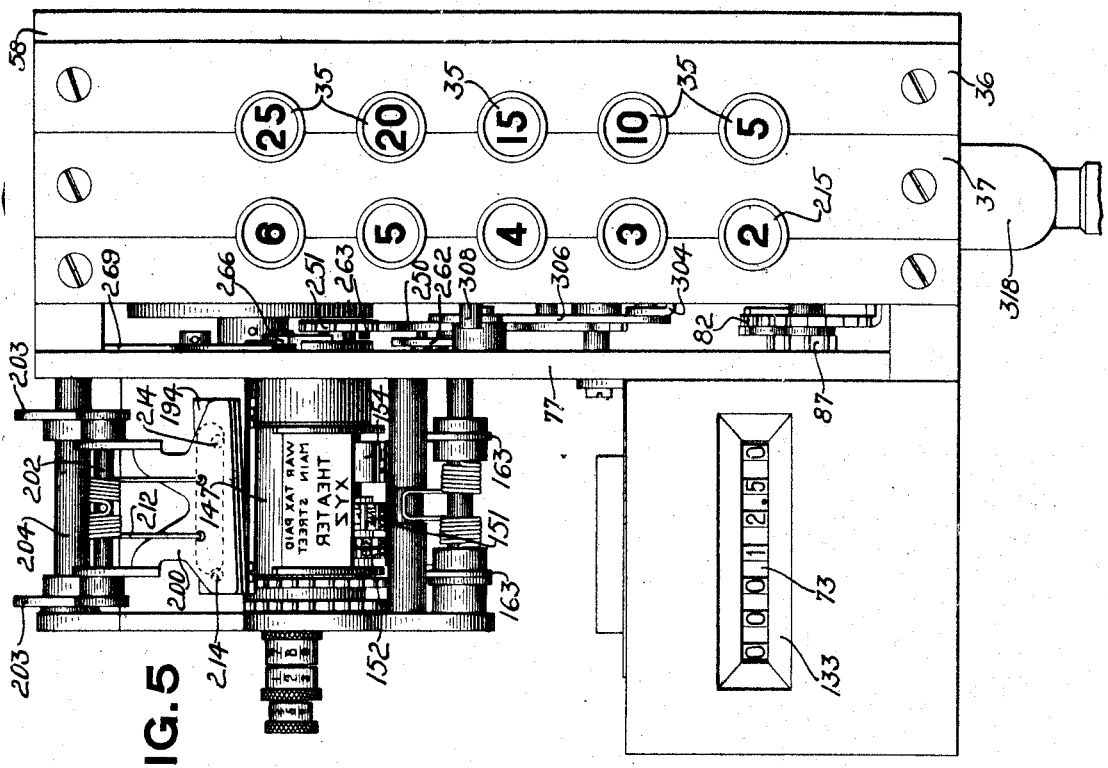
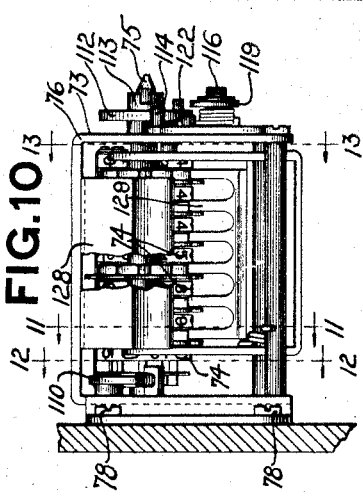
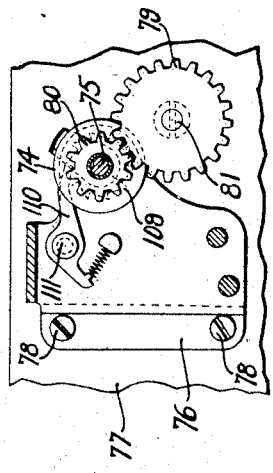
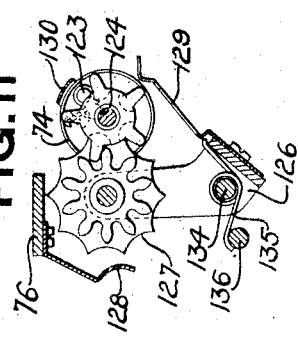
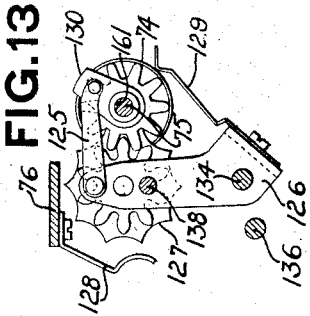
Inventor  
THOMAS CARROLL May 26, 1925. 1,539,462

T. CARROLL

TICKET MACHINE

Filed April 30, 1921   6 Sheets-Sheet 5

Inventor
THOMAS CARROLL
BY
Attorneys

May 26, 1925.
T. CARROLL
TICKET MACHINE
Filed April 30, 1921      6 Sheets-Sheet 6
1,539,462
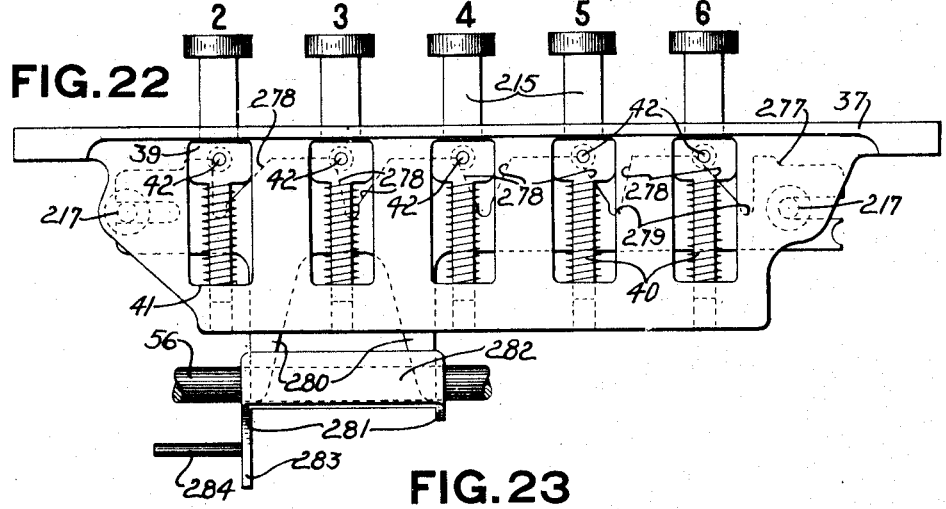
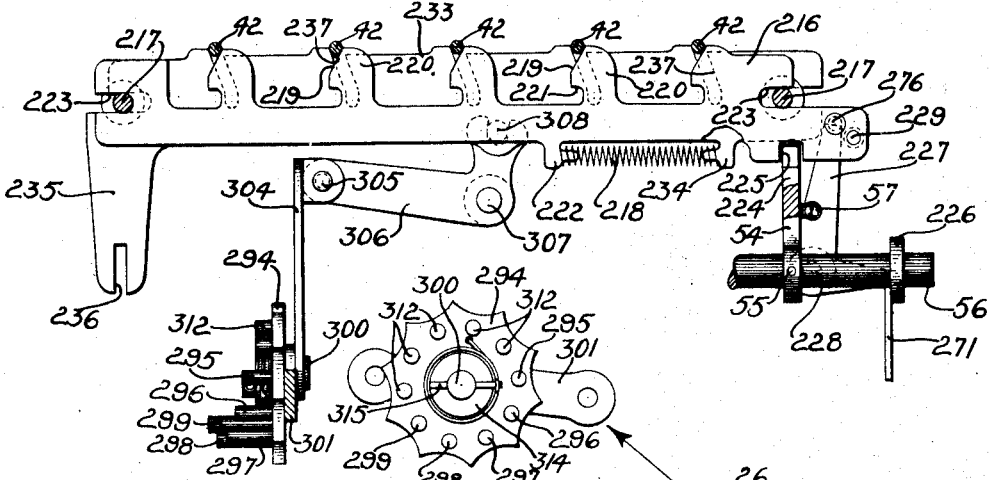
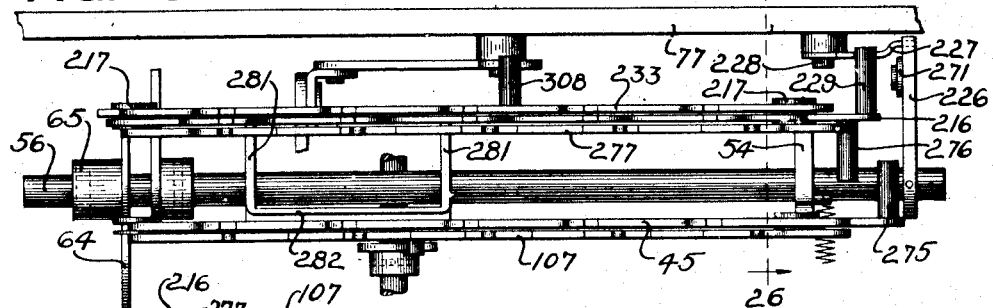
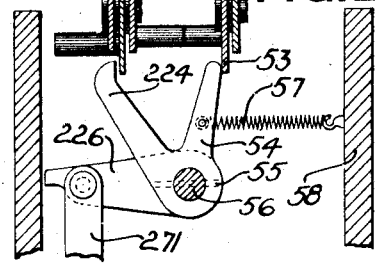
Inventor
THOMAS CARROLL
BY
Attorneys Patented May 26, 1925.

1,539,462

UNITED STATES PATENT OFFICE.

THOMAS CARROLL, OF DAYTON, OHIO, ASSIGNOR TO THE NATIONAL CASH REGISTER COMPANY, OF DAYTON, OHIO.

TICKET MACHINE.

Application filed April 30, 1921. Serial No. 465,754.

*To all whom it may concern:*

Be it known that I, THOMAS CARROLL, a citizen of the United States, residing at Dayton, in the county of Montgomery and State of Ohio, have invented certain new and useful Improvements in Ticket Machines, of which I declare the following to be a full, clear, and exact description.

This invention relates to ticket issuing machines designed to issue tickets of various denominations and more particularly to that class adapted to print and issue one or more tickets of the same denomination at each operation of the machine.

It is an object of this invention to provide a machine which will eliminate as far as possible the loss occasioned by the reselling of used tickets and which will issue a desired number of tickets of a desired denomination to the purchaser at a single operation.

It is a further object of this invention to provide mechanism which will first necessitate an operation of manipulative means controlling the number of tickets to be issued, and subsequently, an operation of manipulative means controlling the denomination of the tickets to be issued, when more than one ticket of a desired denomination is to be issued at one operation of the machine. Operation of the latter means without a preceding manipulation of the former causes the machine to issue but one ticket at a single operation. This construction renders the operation of the machine simpler and the cost of construction cheaper than if the manipulative means controlling the number of tickets had to be operated when it is desired to issue a single ticket.

It is also an object of this invention to embody in such a machine novel mechanism for printing the tickets as they are issued thereby eliminating the carrying of large numbers of valid tickets which might at any time be stolen and used.

Still another object of the invention is to embody in such a machine totalizing mechanism with improved actuating devices whereby the total value of tickets issued by the machine is accumulated. This process of accumulation is essentially a process of multiplication by successive addition, the multiplicand being set up by an amount key and the multiplier by a number key, the product of which is accumulated in the totalizer.

Other objects of the specific constructions disclosed are to prevent an operation of the machine before one of the keys determining the denomination of the tickets to be issued is depressed, for preventing an operation of the machine, when a number key is partially depressed, and for preventing an operation of a number key after an amount key is fully depressed.

With these and incidental objects in view, the invention consists in certain novel features of construction and combinations of parts, the essential elements of which are set forth in appended claims, and a preferred form of embodiment of which is hereinafter described with reference to the drawings which accompany and form part of this specification.

Of said drawings:

Fig. 1 is a transverse section of the machine taken on the line 1—1 of Fig. 2.

Fig. 2 is a front elevation of the machine with the cabinet removed.

Fig. 3 is a front view of the machine taken in section on the line 3—3 of Fig. 1.

Fig. 4 is a left side elevation of the machine with parts of the printer removed for clearness.

Fig. 5 is a top plan view of the machine with the cabinet removed.

Fig. 6 is a detail view of the totalizer actuating mechanism.

Fig. 7 is a detail view of part of the totalizer actuating mechanism.

Fig. 8 is a detail plan view of part of the mechanism shown in Fig. 6.

Fig. 9 is a detail view of the ticket severing knife mechanism.

Fig. 10 is a rear elevation of the totalizer with a part removed for clearness.

Fig. 11 is a detail view of the totalizer transfer mechanism taken in section on the line 11—11 of Fig. 10.

Fig. 12 is a detail view of the totalizer transfer mechanism of the wheel of lowest order, taken in section on the line 12—12 of Fig. 10.

Fig. 13 is a detail view of the totalizer transfer mechanism of wheels of higher order taken in section on the line 13—13 of Fig. 10.

Fig. 22 is a detail view of the ticket key mechanism.

Fig. 23 is a detail view of part of the ticket key bank detents and the multiple cycle controlling mechanism.

Fig. 24 is a detail view of the multiple cycle controlling mechanism.

Fig. 25 is a plan view of the detent mechanism for both key banks.

Fig. 26 is a transverse section of the detent mechanism taken on the line 26—26 of Fig. 25.

Figure 14:
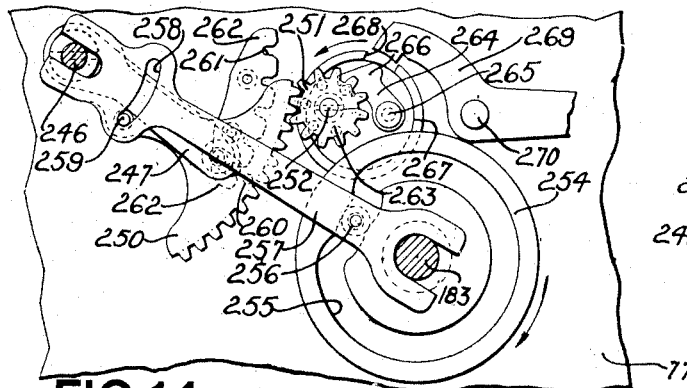
Fig. 14 is a detail view of the price printing wheel actuating mechanism.

The specific embodiment of the invention shown in the drawings is illustrative only, as the invention is equally applicable to other types of accounting machines.

The machine is equipped with a key for each denomination in which the tickets are issued. These keys are arranged in a bank or series and will be referred to herein as "amount" of "denomination" keys. To operate the machine when only one ticket is desired, the operator need only press the proper amount key, the machine then automatically printing and issuing a ticket of the desired denomination, and operating a totalizer according to the price of the ticket.

There is an additional bank or series of keys, one key for each number of tickets that the machine is designed to issue at one operation of the latter, and the keys in this bank are numbered from "2" to "6" inculsive and hereafter will be called the "ticket" or "number" keys.

The machine in the preferred form of embodiment is designed to print tickets of five different denominations, namely 5¢, 10¢, 15¢, 20¢ and 25¢ tickets. It is of course to be understood that a machine can be constructed in accordance with the present invention to issue tickets of any denominations, the denominations of the tickets shown in the drawings being merely used for illustrative purposes.

Amount keys.

The above description briefly points out the general features of the machine constructed in accordance with the invention. The details appear in the drawings in which 35 represents the amount or denomination keys for determining the denomination of the ticket or tickets to be issued. As shown in Fig. 5, the keys are arranged in two rows or banks at the right hand side of the machine and the bank of amount keys 35 is to the right of the number keys 215. As the machine is designed to issue but one ticket upon operation of an amount key when no number key is operated, the various mechanisms of the machine and their operation when only an amount key is operated will be first described and then the devices controlled and operated by the number keys for causing a variable number of operations of these mechanisms when a number key as well as an amount key is operated will be taken up in detail.

The amount keys 35 are slidably mounted in ways or notches cut in the left hand side of a frame member 36 (Figs. 1 and 3) which extends across the top of the right hand side of the machine. The upper right hand edge of an adjacent frame member 37, which is constructed similarly to the frame member 36, contacts with the upper left hand edge of this latter frame to retain the keys in their upper ways or notches. The lower ends of the keys are retained in the ways or notches by a plate 38 (Fig. 3) fast to the frame member 36. The keys are equipped with shoulders 39 (Fig. 1) which normally engage the under surface of the top ledge of the frame 36 to limit their outward upward movement. Springs 40 coiled about the shanks of the keys and under compression between the lower ledge 41 of the frame and the shoulders 39 of the keys serve yieldingly to retain the keys in their normal undepressed positions, and also serve to return the depressed keys to these positions upon being released near the end of the operation of the machine.

Machine and key locking mechanism.

A complete depression of an amount key 35 releases a locking lever to permit an operation of the machine either by a manually turned crank or a motor (not shown), and also causes movement of a detent for locking the depressed key in its operated position and for preventing the operation of the other keys in the bank during an operation of the machine. The mechanism by which these results are accomplished will now be described.

Each key 35 is provided with a pin 42 (Figs. 1 and 3) projecting laterally from the left hand side, which, when the key is depressed, engages the inclined edge 43 of a notch 44 in locking detent plate 45, and as all of the respective notches 44 under the pins 42 on the keys are similarly constructed and inclined rearwardly and downwardly, the depression of any one of the amount keys moves the plate 45 forwardly the same extent. The plate 45 is moved against the tension of a spring 46 and is guided in its movement by two studs 48 projecting from the left side of the key frame 36 into slots 49 in the ends of the plate 45.

Movement of this plate in the manner just described effects the unlocking of the machine through the following described mechanism; near the right hand end of plate 45 (Fig. 1) is a downwardly extending projection 53 which normally stands in the path of one arm of a bell crank member 54 (Figs. 1, 3 and particularly 26) pinned to a horizontal shaft 56 journaled at each end in the frame of the machine. A spring 57 normally holds the member 54 in contact with the projection 53 on the plate 45. As the plate 45 moves forward by depressing one of the keys 35, the member 54 (Figs. 3 and 26) will, under the tension of a spring 57, swing by the projection 53, rocking the shaft 56 in a clockwise direction. Near the left hand end of shaft 56 (Fig. 1) is fastened a locking arm 59 having a formed lip 60 at its lower end. The lip 60 (Figs. 1 and 3) is in a vertical plane with a disc 61 mounted upon and fast to the main driving shaft 62 and notched to form a shoulder 63. In normal position the arm 59 places the lip 60 in front of the shoulder 63 as shown, in which position the machine is locked against operation. The rocking of the shaft 56 as hereinbefore described will remove the lip 60 from the path of the shoulder 63 and thereby permit rotation of the main driving shaft 62 in the direction of the arrow as shown in Fig. 3.

The unlocking of the machine as just described has placed the arm 54 (Figs. 1 and 3) in the path of the projection 53 on the plate 45, whereby the plate 45 is retained in moved position until near the completion of the operation of the machine when the shaft 56 is rocked back to its normal position. The returning of the shaft 56 to its normal position is effected by an arm 64 (Figs. 1 and 3) mounted upon the forward end of shaft 56 and caused to rock with said shaft by a pin 65 and slots 66 in the hub of the arm. The arm 64 extends downward and is normally in a plane with a plate 67 riveted on the disc 61. The disc 61 rotating with the main driving shaft 62 will, at the proper time, move the plate 67 into contact with the lower end of the arm 64, which, by its curved edge, will cause said arm to swing and thus rock the shaft 56 in a counter-clockwise direction. As the arm 64 (Fig. 3) breaks contact with the plate 67 at the completion of a rotation of the main driving shaft 62, the spring 57 (Fig. 26) will cause the shaft 56 to rock in a clockwise direction until the member 54 again contacts with the side of the projection 53 of the plate 45, which is its normal position. When the projection is in this position the locking arm 59 (Fig. 3) is in a position to prevent a further rotation of the main driving shaft 62. When the bell crank 54 is thus rocked counterclockwise (Fig. 26) its arm will pass out of the path of the shoulder 53 on detent plate 45 thus permitting the spring 46 to restore the latter to its normal rear position. The depressed key 35 is returned to its normal position by its spring 40 at the time the detent plate 45 is returned to its normal position.

*Accumulating mechanism.*

The mechanism for accumulating the value of the tickets issued by the machine comprises a totalizer 73 which is always in engagement with its actuating elements. The totalizer comprises elements or wheels 74 (Figs. 3, 4, 5, and 10 and 13) loosely mounted on a shaft 75 carried in a frame 76 fastened to the left side frame 77 of the machine by screws 78 (Fig. 10). The registering wheel 74 of the lowest order, is actuated directly by the actuating gear 79 which is always in mesh with a pinion 80 (Figs. 3 and 12) integral with this totalizer wheel which is provided with alternate "0" and "5" indicators and is arranged to transfer to the wheel of the next highest order at east second step of movement, each wheel of higher order transferring to the higher order wheel after each complete rotation. Carrying operations from wheels of lower order to wheels of higher order are accomplished by the well known Geneva stop type of transfer mechanism as indicated in Figs. 11 and 13.

The actuating gear 79 (Figs. 3, 4 and 12) is rigidly mounted on a shaft 81 which extends longitudinally through the machine. Near the left frame 77 (Figs. 3, 6 and 8) is also rigidly mounted on the shaft 81, a ratchet wheel 82 for the purpose of rotating said shaft 81 in a clockwise direction. Engaging with the ratchet wheel 82, to give motion to the same, is a pawl 83 carried by an arm 85 free on the shaft 81. Said arm 85 carries a compression spring 86 which acts against the pawl 83 to engage same with the ratchet wheel 82. Pinned to the arm 85 is a pinion 87 meshing with a gear segment 88, fulcrumed on a stud 89 projecting from the left frame 77. The gear segment is pivotally connected to one end of a pitman 91. The other end of said pitman 91 is bifurcated to engage a guide stud 92 mounted in the side frame 77. The pitman 91 carries a cam roller 93 (Fig. 6) which engages with the walls of a groove 94 of a drum cam 95 pinned to the main driving shaft 62. The cam 95 gives a reciprocating motion to the pitman 91 and thereby operates the totalizer actuating mechanism.

The amount of movement given to the pitman 91 by the cam 95 will equal a movement to the pawl 83, of five teeth on the ratchet wheel 82. Five teeth on said ratchet wheel will equal 25¢ on the totalizer. Therefore, in registering an amount less than 25¢ it is necessary to reduce the amount of movement given to the ratchet wheel 82. This is accomplished by a formed lip 100 on the pawl 83 (Figs. 6, 7 and 8), which, when the pawl moves in a counterclockwise direction, will contact with the curved edge of an adjustable plate 102 and swing the pawl on its pivot to disengage it from the ratchet wheel 82. As the pawl 83 returns to its normal position as shown in Fig. 6, the lip 100 will ride down the curve on the plate 102 permitting the end of said pawl to engage with a tooth in the ratchet wheel and rotate the ratchet wheel a predetermined amount. As there are different amounts to be entered in the totalizer, such as 5¢, 10¢, 15¢, 20¢ and 25¢, and as one tooth on the ratchet wheel equals 5¢, it is necessary to engage the pawl 83 with the ratchet wheel 82 at various points in its travel so as to rotate said ratchet wheel 82 various distances. This result is accomplished by adjusting the plate 102 different distances in a counterclockwise direction. The plate 102 is rigidly mounted upon one end of a sleeve 103 loosely surrounding the shaft 81 (Figs. 3 and 6). The other end of said sleeve is clutched with the hub of a pinion 104 (Figs. 1 and 3). Engaging with the teeth of this pinion 104 are rack teeth 105 formed in the lower edge of a differential plate 107 slidably mounted upon the studs 48 in the amount key frame 36. The plate 107 has a differently formed notch for each of the pins 42 of the keys 35 (Fig. 1). These notches are formed to vary the distance of travel of the plate 107 according to the key depressed and also to permit a key to return to its normal position without returning the plate 107 to its normal position, which position is shown in Fig. 1. In this position should the 5¢ key be depressed, the differential plate 107 will not be moved, but had one of the other keys been depressed previous to the depression of the 5¢ key, the pin 42 in the 5¢ key would contact with the angle edge 108 of plate 107 and cause the same to slide to the right, bringing it to the position shown in Fig. 1. The keys of higher denomination except the 25¢ key will move the plate 107 either to the right or to the left, depending upon the previous key depressed. The 25¢ key can move the plate only to the left. This differential adjustment of the plate 107 governs the amount of rotation given to the ratchet wheel 82 (Fig. 6) and consequently the amount entered in the totalizer.

In Fig. 12 is shown the registering wheel 74 of the lowest order, to which is fastened a ratchet wheel 109, and engaging with said ratchet wheel is a spring pressed pawl 110, pivoted on a stud 111, which prevents retrograde motion of said registering wheel.

The device employed to turn the totalizer elements 74 of the totalizer to zero position is one well known in the art and is shown in Figs. 3, 4 and 10. In general the device consists of a disc 112 having a slotted hub 113 pinned to the totalizer shaft 75 outside of the totalizer frame. When a key (not shown) which engages with the slotted hub 113, is turned the shaft 75 is turned. The shaft 75 is provided with a groove 124 which cooperates with pawls 123 carried by the wheels (Fig. 11) to pick up the wheels at different points at which the wheels may be standing and turn them to zero as the shaft is rotated. During the rotation of said shaft 75, a pin 114 on an arm 115 on a stud 116 on the totalizer carrying frame is forced out of normal engagement with a notch 117 formed in the periphery of the disc 112. The slightly recessed end 118 of a pawl 119 which has a slot 120 through which the stud 116 passes and which is connected to the arm 115 by a spring 121 coiled about the stud 116, is rocked into the path of a pin 122, projecting laterally from the face of the disc 112 so that when the totalizer wheels reach zero position the pin 122 abuts the end 118 of the pawl 119 and prevents further rotation of the wheels. The pawl is then returned to its initial position by the spring 121, and the pin 114 on the arm 115 again engages the notch in the disc 112.

A yoke 126 (Figs. 11 and 13) is rocked rearward when the totalizer wheels are being turned to zero to carry transfer star wheels 127 out of engagement with the totalizer elements. As the star wheels 127 disengage from the totalizer elements, they will engage with a plate 128, which will keep them in proper alignment, while disengaged from the totalizer elements. At the same time, a forked spring plate 129 will engage with the totalizer elements to align the same when being turned to zero.

The yoke 126 is freely mounted upon a rod 134 (Figs. 4, 11 and 13) which is supported at each end in the totalizer frame. Wound about the rod 134 is a spring 135 one end of which engages with a rod 136 and the other end rests upon the cross member of the yoke 126. This spring serves to hold the star wheels 127 normally into engagement with the totalizing wheels. During the time of turning said totalizing wheels to zero, a slot 137 in the arm 115 (Fig. 4) cooperates with a pin 138 projecting from the yoke 126 (Figs. 4 and 13) to rock said yoke simultaneously with the arm 115.

Freely mounted on the totalizer shaft 75 is a bail 130 connected with the yoke 126 by means of a link 125. While the totalizer is being turned to zero, the rocking of the yoke 126 will cause the bail 130 to swing to a position which will obscure from view the numerals on the totalizer wheels which are shown through the opening 133 (Fig. 5).

Ticket issuing mechanism.

Figure 21:
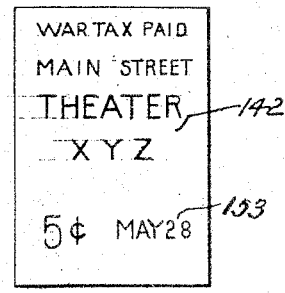
Fig. 21 shows a sample ticket printed and issued by the machine.

As stated above, the machine is adapted to print and issue tickets of different denominations. For this purpose there is a printing mechanism attached to the left side of the machine, which prints and issues a ticket, a sample of which is shown in Fig. 21. This ticket 142 is cut from a strip fed from a ticket roll, which is under the machine but not shown in the drawings, upward through a guide 143 (Figs. 3 and 4) between an electroroll 144 and a platen roll 145, through another guide 146 and between a printing cylinder 147 and a platen roll 148, through another guide 149, past the movable severing knife, which will hereinafter be described, and finally through an opening in the top of the cabinet of the machine. The electroroll 144 may have any suitable design for printing a design or other matter. The printing cylinder 147, in addition to having an electro for printing a design or other matter, has a type wheel 151 (Figs. 3, 5, 16 and 17) which prints the month, and two type wheels 152 for printing the day as shown at 153 on the sample ticket 142 (Fig. 21). This feature being well known in the art will not be described in detail. Said cylinder also contains a type wheel 154 for printing the price of the ticket, the operation of which will hereinafter be described.

An inking roll 155, carried by a rod 156 which rests in recesses 157 in the upper ends of arms 158 pivoted on a rod 159 supported by the frame members of the machine, cooperates with the electro 144 to ink the latter, being held in engagement therewith by means of a spring 160 (Fig. 4) coiled about the rod 159.

Another inking roll 165, carried by a rod 161 which rests in recesses 162 in the lower ends of arms 163 pivoted on a rod 164, cooperates with the cylinder 147 to ink the electro and type wheels therein, being held in engagement therewith by means of a spring 166 coiled about the rod 164 supported by the frame members of the machine. Freely mounted upon the rods 159 and 164 are arms 170 which contact with pins 171 projecting from the inking roll arms. The arms 170 are provided for the purpose of assisting in removing the inking rolls from their supports. To control the degree of contact between the electros and the inking rollers, arms 172 (Fig. 3) pinned to their rods 159 and 164 act as stops for pins 173 projecting from their respective arms 158 and 163.

The electroroll 144 (Fig. 4) is rotated through a gear 174 fast thereon, which meshes with a gear 175 of the same size and fast to the platen roll 145 loose on a rod 176. The platen roll 148 is rotated through a gear 177 fast thereon which meshes with a gear 178 of the same size fast to the printing cylinder 147 journaled in the printer frames. These platen rolls 145 and 148 and electros 144 and 147 also serve as feeding means for the ticket strip as is also usual in the art. Fast to the platen roll 145 and the printing cylinder 147 are mutilated gears 179 and 180 respectively. These mutilated gears mesh with companion mutilated gears 181 and 182 fast to a printer driving shaft 183 journaled in the side frames of the machine. The purpose of the mutilated gears is to give an initial rotation to the driving shaft 183 before rotating the printing and paper feed rolls, and after a complete cycle of said printing and paper feed rolls to have a further rotation of the driving shaft 183 before completing its cycle. The mutilated driving gear 181 has a locking portion 184 which engages with a locking portion 185 in the periphery of the gear 180, and the second mutilated driving gear 182 has a similar locking portion 186 which engages with a locking portion 187 on the gear 179. This locking feature is to prevent the gears from getting out of time with each other during the rotation of the one and the idleness of the other. Upon rotation of the driving shaft 183 in a counter-clockwise direction the periphery of the locking portion 184 of the mutilated gear 181 slides out of contact with the locking portion 185 of the mutilated gear 180 and the teeth on the mutilated gear 181 engage the teeth on the mutilated gear 180, rotating said gear 180 a complete cycle after which the mutilated portion of the gear 181 again engages with the mutilated portion of the gear 180. Simultaneously the mutilated gear 182 has a similar action on the mutilated gear 179.

The printer driving shaft 183 (Figs. 1 and 4) is rotated by a bevel gear 191 fast on said shaft and in mesh with a companion bevel gear 192 pinned to the end of the main driving shaft 62.

The eccentric bearings 193 (Fig. 4) for the electroroll 144 and the platen roll 148 furnish adjustment for the electroimpression on the ticket strip, and as the mechanism is well known in the art it will not be described in detail here.

The machine, as before stated, is equipped with severing means constructed to completely sever the ticket issued from the ticket roll. As shown in Figs. 4 and 9, this severing means consists of a movable knife 194 designed to cooperate with a corresponding stationary knife edge 195. The stationary knife edge 195 is formed in a plate 196 rigidly mounted on the top of a frame 197. It can be seen from Fig. 4 that the ticket strip, after passing between the rolls 144 and 145, will enter a guide 198, and leaving said guide, will pass between the rollers 147 and 148, after which the ticket strip will enter the guide 149.

As shown in Figs. 4 and 9, the guide 199 for the ticket strip extends into the central vertical opening formed in the frame 197. The movable knife 194 is carried in a frame 200 which has two arms 201 forked to engage with a rod 202 mounted in two arms 203 rigidly mounted on a shaft 204 journaled in the printer frame. Pinned to the shaft 204 is an arm 205 which carries in its lower end a cam roller 206 which engages with the walls of a groove 207 formed in the side of a disc 208 rigidly mounted on the printer driving shaft 183. When the printer driving shaft 183 is turned upon an operation of the machine, the arm 205 is rocked about its pivotal point causing the arms 203 fast to shaft 204 to rock toward the rear of the machine, thus carrying the knife frame 200 rearward. The movable knife 194, being withdrawn from the opening, the printed ticket is fed between the movable knife and the stationary knife edge, so that when the arm 205 is restored to normal position the knife frame will be given a forward movement to sever the ticket fed between the knives. A spring 212 wound around the rod 202 with one end connected with a pin 213 and the other end resting upon the movable knife frame 200, provides the proper pressure to hold the movable knife against the stationary knife. The movable knife is fastened to the frame 200 by two pins 214 which loosely pass through holes in the movable knife 194.

Figure 15:
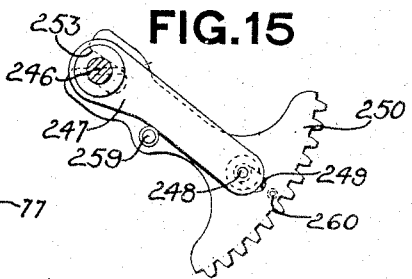
Fig. 15 is a detail view of the price printing wheel actuating segment.
Figure 16:
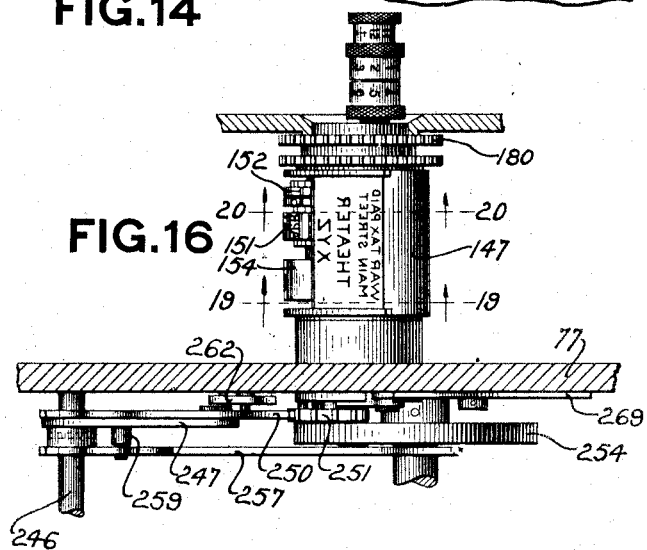
Fig. 16 is a detail view of the ticket printing cylinder and mechanism shown in Fig. 14.
Figure 19:
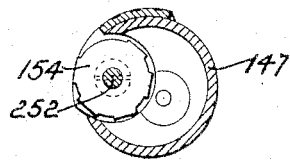
Fig. 19 is a cross section of the ticket printing cylinder taken on the line 19—19 of Fig. 16.
Figure 20:
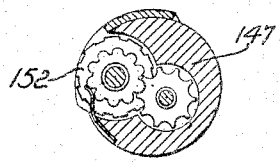
Fig. 20 is a cross section of the ticket printing cylinder taken on the line 20—20 of Fig. 16.
Figure 17:
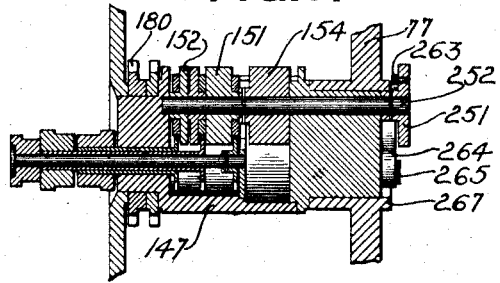
Fig. 17 is a view of the ticket printing cylinder shown in section.

The changing of the position of the type wheel 154 for printing the price of the ticket is controlled by the differential plate 107, hereinbefore described, in the amount bank. Near the center of said differential plate 107 (Fig. 1) and projecting downward, is an arm 242 having near its lower end a pin 243, which projects laterally into a slot 244 formed in the end of an arm 245 pinned to a rod 246 loosely supported at each end by the side frames of the machine. As the differential plate 107 is moved forward and rearward by the depression of an amount key 35, the rod 246 will be rocked in a counter-clockwise and a clockwise direction. Pinned to said rod 246 near the left side frame is an arm 247 (Figs. 1, 14 and 15) extending downwardly and rearwardly, and having near its lower end a pin 248 which projects laterally into a slot 249 formed in a segment 250. It will thus be seen that the rocking of the arm 247 will rock the segment 250 also. This segment is normally engaged with a gear 251 which is fast on shaft 252 (Figs. 1, 14, 16 and 17) extending into the cylinder 147 where the type wheel 154 is rigidly mounted upon said shaft. It can thus be seen that when any one of the amount keys 35 (Fig. 1) is depressed, its pin 42 coming in contact with the differential plate 107 will cause the type wheel 154 to rotate either in a clockwise or counter-clockwise direction according to the position into which the differential plate had previously been placed.

Since the cylinder rotates during the operation of the machine, it is necessary to disengage the segment 250 from the gear 251 during the greater part of the operation. The segment 250 is bifurcated as at 253 to pivotally and slidingly engage the rod 246 thereby permitting it to slide against its operating member 247. Rigidly mounted upon the printer driving shaft 183 is a disk 254 provided with a groove 255 with which cooperates a cam roller 256 freely mounted upon a stud projecting from the side of a pitman 257, the lower end of which is bifurcated to straddle the shaft 183, the upper end being of like formation to straddle the shaft 246. Near the upper end of said pitman is a curved slot 258 into which projects a pin 259 carried by the segment 250. The groove in the disk is formed so as to disengage the segment from the gear at the beginning of an operation and to return it to its normal position near the end of the operation. It is on account of this movement of the segment that the mutilated gears in the printer are required.

As the segment 250 is disengaged from the gear 251, a pin 260 carried by the segment is moved into one of the slots 261 in a plate 262 fastened to the left side frame of the machine, the purpose of which is to retain the segment in its adjusted position until after the cylinder has stopped rotating, so that the segment will again engage with the gear in its same relative position. There are five slots 261, one for each position of the segment. The amount type wheel is held in its set position after the segment has been disengaged by means of pins 263 which project from the inside face of the gear 251 and engage with a notched pawl 264 pivoted on a stud 265 mounted in the end of the cylinder 147. The pawl is held in locked position by a curved projection 266 which is brought into contact with the inner face of a circular flange 267 projecting from the left side frame 77. An opening 268 in the flange 267, through which the projection 266 may pass, permits the pawl to pivot during rotation of the gear 251 as the amount type wheel is adjusted. A lever 269 fulcrumed on a stud 270 projecting from the left side frame, and connected by a link 271 to an arm 266 pinned to the rock shaft 56 (Figs. 1, 23, 25 and 26) is swung to close the opening 268 during an operation of the machine.

From the foregoing description it can be seen that by depressing one of the amount keys which allows the shaft 56 to rock upon the action of the spring 57, the lever 269 will be swung on its pivot 270, thereby closing the opening in the flange 267, and will remain in this position until near the end of the operation when the amount key is returned to its normal position.

Ticket keys.

The ticket keys 215 (Figs. 3, 4, 5 and 22) are of the same construction as the amount keys and are mounted in the frame 37 which is of the same construction as the amount key bank frame 36. As the amount keys serve to rock the locking arm 59 out of engagement with the disk 61 on the main driving shaft 62 to permit the main driving shaft to rotate during the operation of the machine, it is desirable to provide a locking detent for retaining an operated ticket key in depressed position until an amount key is operated, and also to provide an element, which is controlled by the amount keys, for locking the ticket key detent to retain the operated ticket key in depressed position until near the end of the operation of the machine.

The locking detent 216 shown in Figures 23 and 25 is freely mounted upon two studs 217 projecting from the key frame 37 and is normally held in its forward position by an expension spring 218 positioned between a lug 222 extending downward from the key detent 216 and a lug 234 on a plate 233. The extent of movement of said detent 216 forwardly and rearwardly is controlled by the length of the slots 223 in the ends of said detent. The pins 42 projecting from the left hand side of the ticket keys 215 normally engage the inclined edges 219 of the projections 220 on the detent 216. Depression of a ticket key through this engagement of its pin 42 with the inclined edge 219, causes the detent 216 to slide rearwardly on the studs 217 until the pin 42 on a depressed key passes out of engagement with the inclined edge and under the shoulder 221 of the projection 220 on the detent, when the spring 218 forces the detent forward to normal position. In this position of the detent the shoulder 221 passes over the pin 42 on a depressed ticket key and holds the key in depressed position. The plate 233 hereinafter described has been moved to the left and effectually locks the undepressed keys in normal position.

For the purpose of preventing an operation of a ticket key after an amount key has been depressed, or an operation of an amount key while a ticket key is being depressed, the arm 224 of the bell crank 54, hereinbefore mentioned, is positioned in alinement with a notch 225 in the locking detent 216 when the detent is in normal and completely operated positions. If an amount key is depressed the detent 45 moves forward and disengages the projection 53 (Fig. 1) from the arm 54, allowing the arm 224 to swing into locking engagement with the locking detent and prevent the depression of a ticket key. When a ticket key is only partially depressed, the notch and arm are out of alinement thereby preventing a movement of the other arm of the bell crank out of locking engagement with the locking detent 45 of the amount key bank. The arm 224 and notch 225 are held in locking engagement until a selected number of tickets of a chosen denomination have been printed.

Near the end of the operation of the machine the rock shaft 56 will be rocked in a counter-clockwise direction to a greater distance than the normal position, as shown in Fig. 26. This additional movement of the shaft 56 is for the purpose of permitting a release of the depressed key in the ticket bank. An arm 226 pinned to the shaft 56 (Figs. 23, 25 and 26) extends to the left, and near the left side frame, contacts with a bell crank 227 which is fulcrumed on a stud 228 mounted in the left side frame of the machine. As the shaft 56 is rocked, the upper extending member of the bell crank 227 cooperates with a pin 229 which projects from the left side of the locking detent 216 to force the detent against the resistance of the spring 218 in a rearward direction a distance sufficient to remove the shoulder 221 on the detent 216 from contact with the key pin 42, and thereby permit the depressed key 215 to return to its normal position.

When two or more tickets are issued it will be necessary to move the locking arm 64 (Figs. 1 and 3) out of the plane of the stop plate 67 so that the main driving shaft 62 may make a variable number of rotations according to the number of tickets to be issued. The movement of the stop to this operated position is controlled by the ticket keys. A plate 233 (Figs. 23, 25 and 26) which is freely mounted upon the studs 217 in a similar manner to the detent 216, has inclined slots 237 in which the key pins 42 travel when any of the ticket keys 215 are depressed. The depressing of any of the ticket keys 215 will cause the plate 233 to slide forward and the return of the depressed key to its normal position will also return the plate 233 to its normal position, as shown in Fig. 23. At the forward end of the plate 233 is a downwardly extending projection 235 with a slot 236 in its lower end operatively receiving the arm 64 which is freely mounted upon the rock shaft 56, as shown in Figs. 1, 3 and 25. As the plate 233 is moved forward by the action of the key pin 42 it will cause the arm 64 to slide forward on the shaft 56 and thereby pass out of the plane of the plate 67, as shown in Figs. 1 and 3. In the shifted position the main driving shaft 62 will be permitted to rotate two or more revolutions as determined by the ticket key depressed. Near the end of the operation when the depressed ticket returns to its normal position the locking arm 64 will be simultaneously returned to its normal position.

To prevent depression of keys in both the ticket bank and the amount bank simultaneously, there is mounted near the rear end of the plate 45 of the amount bank (Fig. 25), a pin 275 which projects laterally, and in a horizontal plane with a pin 276 which projects from the detent 216 in the ticket bank. As the plate 45 and detent 216 move in opposite directions when actuated by their respective keys, the pins 275 and 276 will contact and prevent a complete depression of the keys if the keys are depressed simultaneously.

*Mechanism controlling the variable operation of the machine.*

For the purpose of determining the number of tickets to be issued at a single operation of the main operating mechanism, the ticket bank of keys is provided with a movable plate 277 which is freely mounted upon the studs 217 (Figs. 22, 25 and 26). The pins 42 projecting from the left side of the ticket keys cooperate with the inclined edges 278 of the notches 279 in the plates 277. These edges are inclined downwardly with differential inclinations, terminating in vertically extending portions. The plate 277 will be caused to slide either forwardly or rearwardly when a key 215 is depressed, the direction of movement depending upon the position in which the plate had been left during the previous operation of the machine, the plate not returning to a normal position after each operation. Extending in a downward direction from the plate 277 are two arms 280 which engage with the inside faces of the arms 281 of a yoke member 282, which is freely mounted upon the rock shaft 56. The yoke 282 at its forward end has a projection 283 extending downward to be engaged by one of a series of pins to be rocked thereby. These pins control the stopping of the machine after the required number of tickets determined by the ticket key depressed has been issued.

As the yoke 282 is rocked, a pin 284 projecting forward from the arm 283 will cause a plate 285 (Figs. 3 and 18) to swing in a counter-clockwise direction to a position to bring a pin 286 into the path of a cam plate 287, mounted upon the side of a disc 274 pinned to the main driving shaft which in its rotating motion will contact with said pin 286 and give to the plate 285 a further counter-clockwise motion. This additional movement will cause a pin 288 to come in contact with the locking arm 59 and rock the same on its pivot 56 thereby bringing the lip 60 into the path of the shoulder 63 on the disk 61 and preventing a further rotation of said shaft 62. The pin 284 projects into a curved slot 289 in the plate 285. This slot permits such additional movement of the plate 285 without a further rocking motion of the yoke 282. The plate 285 is retained in its normal position by a spring 290. In this position, an upwardly extending projection 291 thereon abuts against the hub on the arm 59 which is pinned to the rock shaft 56. The plate 285 is freely mounted upon a stud 292 which projects from the front frame member 293 (Fig. 1).

The pins with which the projection 283 cooperates are carried by a star wheel 294, and are of different lengths, only one of which will come into contact with said projection at each operation of the machine to actuate the machine locking mechanism when two or more tickets are to be issued. As the yoke 282 receives a sliding motion on the shaft 56, determined by the ticket key depressed, it will be placed in various positions to be engaged by one of the series of pins in the star wheel 294. As shown in Figs. 23 and 24, pins 295, 296, 297, 298, and 299 will rock the yoke 282 respectively when two, three, four, five and six tickets are to be issued.

Figure 18:
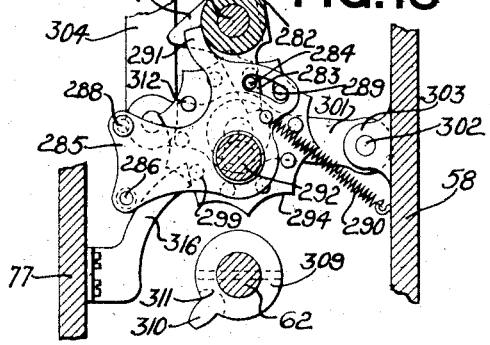
Fig. 18 is a detail view of the multiple cycle controlling mechanism.

The star wheel 294 is freely mounted upon a stud 300 carried by an arm 301 pivoted on a stud 302 mounted in a lug 303 on the side frame 58. Pivoted to the left hand end of arm 301 (Fig. 18) is a link 304 which extends upward and pivots on a stud 305 mounted in the forward end of a bell crank lever 306 (Fig. 23) fulcrumed on a stud 307 projecting from the left side frame of the machine. The upward extending member of the bell crank lever 306 is bifurcated to engage with a pin 308 which projects laterally from the plate 233 in the ticket key bank. As this mechanism is brought into play only when two or more tickets are issued, the star wheel is normally out of operative engagement with the main driving shaft 62, this engagement with the said shaft 62 being controlled by the plate 233 of the ticket key bank. The drawings show this mechanism in its inoperative position. Referring to Fig. 18 it may be seen that as the arm 301 is lowered by depressing a key in the ticket key bank, the star wheel 294 is moved into contact with a disk 309 pinned to the main driving shaft 62.

The disk 309 has a projecting tooth 310 which at each revolution of the shaft 62 will engage with one of the pins mounted in the star wheel 294 and by so doing will cause the star wheel 294 to turn in a counter-clockwise direction the distance of one division, which will bring the adjoining curved surface of the star wheel into contact with the disk 309. A recess 311 in the disk 309 permits rotation of the star wheel 294 at the proper time. The shaft 62 will continue to rotate and at each revolution move the star wheel 294 one division until one of the pins in the star wheel comes into contact with the projection 283 on the yoke 284 and rock said yoke to bring into play the locking mechanism, as hereinbefore described. The drawings show five pins which will rock the yoke 282, the additional five pins 312 being provided merely for rotating the star wheel. As the shaft 62 is rotated by the operating mechanism of the machine and in turn rotates the star wheel 294, a spring 313 (Figs. 1 and 24), which is coiled about a hub 314 mounted in the star wheel 294, will be given additional tension. One end of the spring is held by a pin 315 which is fast in the stud 300, the other end of the spring being attached to the star wheel 294. As the ticket key 215 will be released and returned to its normal position near the end of the operation of the machine, the star wheel 294 will again be moved out of engagement with the disk 309, at which time the spring 313 will cause the star wheel 294 to rotate in a clockwise direction to its normal position, as shown in Fig. 18, in which position the pin 299 comes into contact with a bracket 316 which projects from the left side frame 77.

Operation.

As the operation of the various mechanisms of the machine has been described in connection with the detailed description of the mechanisms but a brief description of the general operation of the machine is thought to be desirable and will now be given.

The operation of the machine will be described when it is operated to issue four 10¢ tickets. The operator first presses the "4" ticket key and as the pin 42 in the key 215 passes down the inclined surface 219 of the detent 216 (Fig. 23) to a position beneath the shoulder 221, the spring 218 will force the plate 216 forward, latching the key in its depressed position. The depression of this key, through the engagement of the pin 42 on the key with a wall 278 of the notch 279 under the pin in the plate 277 (Fig. 22), moves the plate differentially and through the projections 280 slides the yoke 282 two positions forward. At the same time the key pin 42 moving in the slot 237 in the plate 233 (Fig. 23) will move the plate and thereby lower the star wheel 294 into operative position with the main driving shaft 62. Simultaneously the downward projection 235 at the forward end of said plate 233 will slide the arm 64 (Fig. 1) out of the plane of the cam plate 67 mounted on the main driving shaft 62.

The 10¢ key is then depressed and the plate 45 is moved forward removing the projection 53 (Fig. 1) out of the path of the arm 54 mounted on the rock shaft 56, allowing the spring 57 to rock the shaft to bring the arm 224 (Fig. 23) into the notch 225 in which position the key 215 in the ticket key bank is locked until near the end of the operation.

Simultaneously with the rocking of the shaft 56 the machine is unlocked ready for operation. The plate 45 also serves the purpose of retaining the amount key in its depressed position, being held in its operated position by the arm 54 and projection 53 on the plate 45. The depression of this key through engagement of its pin 42 with the notch 317 under the pin in the plate 107, moves the plate differentially and gives the gear 104 one degree or step of rotary motion. The gear 104 being sleeved to the plate 102 (Fig. 6) will convey the same degree of motion to this plate. As the totalizer actuating pawl 83 has a given movement at each operation of the machine the position of the plate 102 determines the position of engagement of pawl 83 with the ratchet wheel 82. The 10¢ key moving the plate 102 one degree of movement will allow the pawl 83 to engage with the ratchet wheel 82 at a position to rotate said ratchet wheel the distance of two teeth. The ratchet wheel 82 being fast on one end of the shaft 81, the other end of the shaft having a gear 79 (Fig. 12) which is always in engagement with a pinion 80 fast to the totalizer wheel of the lowest order, will rotate said totalizer wheel two degrees or spaces and record 10¢, which is the amount represented by the depressed key. The depression of this key also rotates the type wheel 154 (Fig. 16) so as to print 10¢ on the ticket to be issued. This is done through the downward projecting member 242 on the plate 107 (Fig. 1) which rocks the shaft 246, and in turn the segment 250 which is normally in mesh with the gear 251 pinned to the type wheel shaft 252. As the depressing of the amount key unlocks the machine the operator rotates the operating handle 318 (Fig. 1) four revolutions in a clockwise direction, the operating handle being stopped at the end of the fourth revolution by the locking arm 59 (Fig. 3) which is controlled by the ticket key, which in this case is the "4" key. As the operating handle is attached to the main driving shaft 62, and this shaft is connected to the printer driving shaft 183 the ticket feeding and printing rolls will make four complete revolutions, and by so doing will print and issue four 10¢ tickets. As the ticket severing means, which is the movable knife 194 and the stationary knife 195, will operate at each revolution of the operating handle, the tickets will be issued as four separate tickets, each ticket being severed from the ticket strip after it is printed. The mutilated gears on the main driving shaft and on the printing cylinders (Fig. 4) permit sufficient movement of the driving shaft to cause the type wheel actuating segment 250 (Fig. 14) to disengage and to again engage with its companion gear just before and after the operation of the printing mechanism. Near the end of the last revolution of the operating handle the shaft 56 is rocked as the star wheel 294 brings the locking arm 59 into position to prevent further rotation of the main driving shaft 62, to which the operating handle is attached. The rocking of the shaft 56 also releases the plates in both the ticket key bank and the amount key bank allowing the depressed keys to return to their normal position.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a ticket issuing device adapted to issue a plurality of tickets at one operation, means for printing said tickets as they are issued, operating means therefor adapted to be operated a number of times corresponding to the number of tickets to be issued, a pivoted element for said means adapted to be differentially moved by keys, and a differentially rotating member cooperating with said pivoted element for determining the number of operations of said operating means and the ticket issuing and printing device.

2. In a machine of the class described, the combination of a ticket printing and issuing mechanism adapted to issue one or more tickets at an operation of the machine, a rotating printing cylinder having a differentially oscillating type wheel, an actuating means for said type wheel, a series of keys and a differentially operated plate under control of said keys for controlling the position of said type wheel.

3. In a machine of the class described, the combination of a rotating printing cylinder, an oscillating type wheel within said cylinder, a type wheel actuating segment, operative means for rotating said cylinder, a series of keys, a plate differentially operated by said keys, means intermediate said plate and said segment for controlling the movement of said segment, and means for disengaging said segment from said type wheel during rotation of said cylinder.

4. In a machine of the class described, the combination of a rotating printing cylinder, a type wheel within said cylinder, an actuating segment for said type wheel, operating means for rotating said cylinder, means actuated by said operating means for disengaging said segment from said type wheel, and means for locking said type wheel against operation during the time that said segment is being disengaged from said type wheel.

5. In a machine of the class described, the combination of a ticket issuing mechanism and operating means therefor, a rotating cylinder, a differentially operated type wheel within said cylinder, an actuating means for said type wheel to be disengaged from the type wheel during the rotation of said cylinder, and mutilated gears connecting said operating means with said rotating cylinder to prevent rotation of said cylinder as said actuating means is disengaged from and engaged with said type wheel during an operation of the machine.

6. In a machine of the class described, a rotatable printing cylinder, a differentially adjustable type carrier within the cylinder, and manipulative means corresponding in number to the number of adjusted positions of the type carrier for adjusting the type carrier according to the amount represented by the manipulative means operated.

7. In a machine of the class described, a rotatably mounted printing cylinder, type mounted therein and adjustable into printing position with respect to the cylinder while the cylinder is at rest, and a plurality of means each individual to a type for moving its respective type to printing position.

8. In a machine of the class described, a rotatably mounted printing cylinder adapted to be rotated during printing, a type carrier rotatable with respect to the cylinder and differentially adjustable to bring different type into printing position while the cylinder is at rest, and means rigid with the frame of the machine for preventing an adjustment of the type carrier during rotation of the printing cylinder.

9. In a machine of the class described, a rotatable printing cylinder, type carrying means movably mounted therein, means for adjusting said type carrying means to bring any selected type to printing position while the cylinder is at rest, and means carried by the cylinder and cooperating with said type carrying means and a rigid part of the machine for locking said type carrying means against adjustment during rotation of the printing cylinder.

10. In a machine of the class described, a revolving printing member mounted for movement during a printing operation, a plurality of type carried thereby and movable relatively thereto into printing position, and a plurality of manipulative means corresponding in number to the number of type and each assigned to its respective type, to move the same into printing position.

11. In a machine of the class described, a frame member, a printing cylinder rotatably mounted therein, an interrupted circular flange carried by the frame member and coaxially disposed with respect to the cylinder, a type carrier carried within the cylinder, a rotatable type adjusting member extending through the cylinder, and a pawl carried by the cylinder for locking the rotatable member, the pawl being normally positioned to be movable out of engagement with said adjusting member into said interrupted portion of said flange while the cylinder is at rest, and cooperable with said flange to prevent readjustment of said type when said cylinder is in motion.

12. In a machine of the class described, a frame member, a printing cylinder rotatably mounted therein, an interrupted circular flange carried by the frame member and coaxially disposed with respect to the cylinder, a type carrier carried within the cylinder, a rotatable type adjusting member extending through the cylinder, a pawl carried by the cylinder for locking the rotatable member, the pawl being normally positioned to be movable out of engagement with said adjusting member into said interrupted portion of said flange while the cylinder is at rest, and cooperable with said flange to prevent readjustment of said type when said cylinder is in motion, manipulative means for actuating said adjusting member, and means under control of the manipulative means for closing said interrupted portion of said flange.

13. In a machine of the class described, a frame member, a printing cylinder rotatably mounted therein, an interrupted circular flange carried by the frame member and coaxially disposed with respect to the cylinder, a type carrier carried within the cylinder, a rotatable type adjusting member extending through the cylinder, a pawl carried by the cylinder for locking the rotatable member, the pawl being normally positioned to be movable out of engagement with said adjusting member into said interrupted portion of said flange while the cylinder is at rest, and cooperable with said flange to prevent readjustment of said type when said cylinder is in motion, manipulative means for actuating said adjusting member, a closure member mounted on said frame for bridging said interrupted portion, and means under the control of said manipulative means for operatively positioning said closure after adjustment of the type has been effected.

14. In a machine of the class described, a frame member, a printing cylinder rotatably mounted therein, an interrupted circular flange carried by the frame member and coaxially disposed with respect to the cylinder, a type carrier carried within the cylinder, a rotatable type adjusting member extending through the cylinder, a pawl carried by the cylinder for locking the rotatable member, the pawl being normally positioned to be movable out of engagement with said adjusting member into said interrupted portion of said flange while the cylinder is at rest, and cooperable with said flange to prevent readjustment of said type when said cylinder is in motion, manipulative means for actuating said adjusting member, a closure member mounted on said frame for bridging said interrupted portion, means under the control of said manipulative means for operatively positioning said closure member after adjustment of the type has been effected, an operating means for operating said cylinder one or more cycles at each operation of the machine, and means for predetermining the number of cycles of operation of the cylinder at each operation of the machine and for preventing a movement of said closure member into inoperative position between successive cycles of the same operation.

15. In a machine of the class described, the combination of a printing mechanism involving adjustable type, manipulative means for adjusting said type, means controlled by said manipulative means for locking the type in adjusted position and for releasing the printing mechanism for operation, means for locking the type in adjusted position during the operation of the printing mechanism, means for predetermining the number of cycles of operation of the printing mechanism at each operation of the machine, and means under control of said predetermining means for preventing a return of said first mentioned locking means to normal during intermediate cycles of operation of the printing mechanism.

16. In a machine of the class described, the combination of a frame member, a printing cylinder journalled in said member, a differentially adjustable type carrier rotatably mounted within said cylinder, and means on the cylinder and frame normally in non-cooperative relation adapted upon movement of the cylinder to be brought into cooperative relation to lock the type carrier in adjusted position during rotation of the cylinder.

17. In a machine of the class described, the combination of a frame member, a printing cylinder journalled in the frame member and carrying a differentially adjustable type carrier, means for adjusting said type carrier, and means carried by the frame effective upon rotation of the cylinder to lock the type carrier in adjusted position and ineffective when the cylinder is in its normal position of rest.

18. In a machine of the class described, the combination of a rotatable cylinder including an adjustable type carrier, actuating means normally operatively connected to said carriers, manipulative means for differentially controlling the extent of movement of said actuating means, an operating mechanism for said cylinder, means controlled by the manipulative means for releasing the operating mechanism, and means actuated by said operating mechanism for destroying the operative connection between said type carrier actuating means and type carrier at the beginning of each cycle of movement of the operating mechanism and for establishing such connection at the end of each cycle of movement.

19. In a machine of the class described, the combination of a rotatable cylinder including an adjustable type carrier, actuating means normally operatively connected to said carrier, manipulative means for differentially controlling the extent of movement of said actuating means, an operating mechanism for said cylinder, means controlled by the manipulative means for releasing the operating mechanism, means actuated by said operating mechanism for destroying the operative connection between said type carrier actuating means and type carrier at the beginning of each cycle of movement of the operating mechanism and for establishing such connection at the end of each cycle of movement, and means for maintaining said type carrier actuating means in its differentially moved position while disengaged from said type carrier.

20. In a machine of the class described, the combination of a rotating printing cylinder, a type wheel within said cylinder, an actuating segment for said type wheel, manipulative means for operating said actuating segment, operating means for rotating said cylinder, means actuated by said operating means for disengaging said segment from said type wheel, and means for locking said type wheel against operation during the time that said segment is disengaged from said type wheel.

21. In a machine of the class described, the combination of a rotating printing cylinder, a movable type bearing member within said cylinder, a manipulative item entering means, an actuating segment operated by said item entering means for actuating said type wheel, operating means for rotating said cylinder, means actuated by said operating means for disengaging said segment from said type wheel, and means for locking said type wheel against operation during the time that said segment is disengaged from said type wheel.

22. In a machine of the class described, the combination of a rotating printing cylinder, a type wheel within said cylinder, an actuating segment for said type wheel, a manipulative item entering means, operating means for rotating said cylinder, and means actuated by said item entering means for operating said type wheel actuating segment and said type wheel locking means.

23. In a machine of the class described, a printing member mounted for movement during a printing operation, a plurality of type mounted on a wheel carried thereby and movable relatively thereto into printing position, and a plurality of manipulative means corresponding in number to the number of type and each assigned to its respective type to move the same into printing position.

In testimony whereof I affix my signature.

THOMAS CARROLL.